Nov. 9, 1965 G. E. COMSTOCK 3D 3,216,542
MAGNETIC FLUID CLUTCH WITH NON-CONDUCTIVE SPACER
Filed Nov. 7, 1963
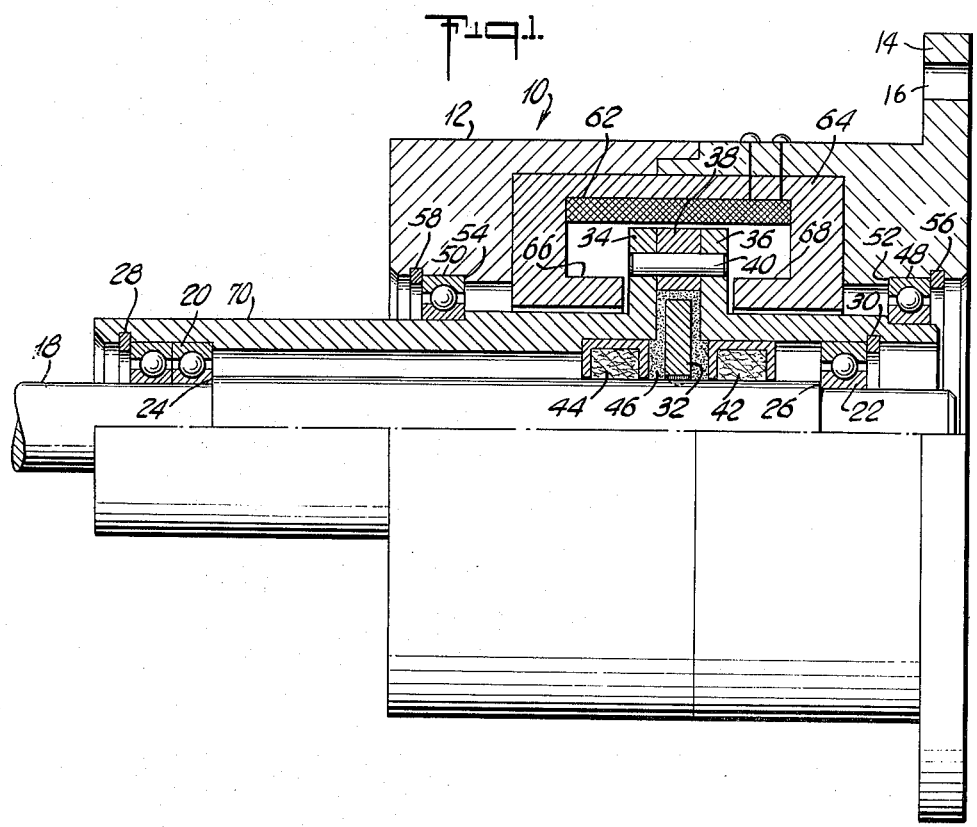
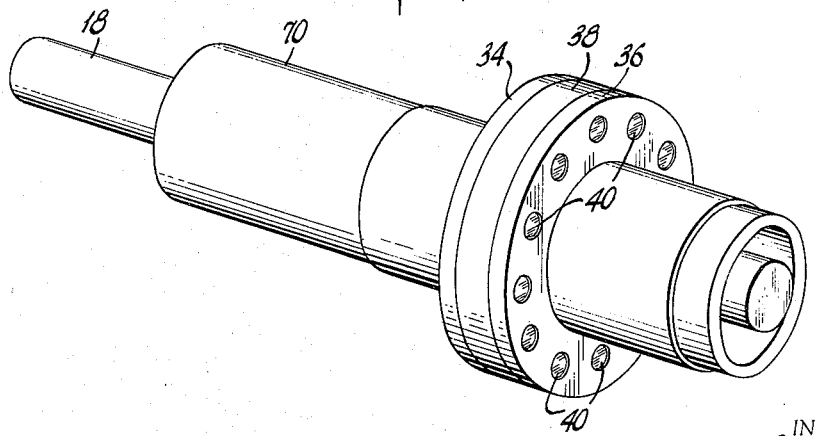
INVENTOR.
GEORGE E. COMSTOCK, 3d
BY
Douglas M. Clarkson
ATTORNEY

United States Patent Office 3,216,542
Patented Nov. 9, 1965

3,216,542
MAGNETIC FLUID CLUTCH WITH NON-
CONDUCTIVE SPACER
George E. Comstock 3d, Huntington, N.Y., assignor to
Potter Instrument Company, Inc., Plainview, N.Y., a
corporation of New York
Filed Nov. 7, 1963, Ser. No. 322,082
5 Claims. (Cl. 192—21.5)

This invention, generally relates to magnetic particle clutches and, more particularly, relates to an improved magnetic particle clutch having improved response time.

Magnetic particle clutches, of course, are known to the art. A common construction used in commercially available clutches includes an output shaft to which a driven disc is fixedly secured and two drive members are mounted rotatably on the output shaft on opposite sides of the driven disc.

The space between the driven disc and the drive members is filled with magnetic particles such as dry powder or magnetic particles suspended in a suitable carrier. When a magnetic field is applied axially across the drive members and the driven disc, the magnetic particles will lock into chains, thereby coupling the driven disc and the drive members together.

The use of drive members on each side of the driven disc has been found to be desirable in providing a maximum output torque.

To couple the two driven discs together and to provide a seal to contain the magnetic particles, a commonly used construction is to provide a torque tube or sleeve surrounding the two drive members and defining a space within which the driven disc is mounted. Suitable shaft seals are used on the interior of the drive members to contain the magnetic particles.

The torque tube usually is made of steel to provide the strength for the necessary positive mechanical coupling between the two members and to hold accurate clearances between the drive members and the driven disc. Since the torque tube must not constitute a magnetc shunt for the flux, it has been usual to construct this tube of a non-magnetic stainless steel.

However, the utilization of an electrically conducting material reduces the response speed of the clutch.

The torque tube constitutes a single turn winding linking the active flux set up by the magnetic coil. Thus, when the clutch is energized and the flux is changing, a circulating current is set up in the torque tube as in the short circuited secondary winding of a transformer. Not only does this circulating current dissipate energy uselessly, but it generates a magnetic field bucking the inducing magnetic field which delays the buildup of the field in the active gap and which reduces the response speed of the clutch.

Therefore, it is an object of this invention to provide a magnetic particle clutch in which the response speed is improved.

It is a further object of this invention to provide a magnetic particle clutch in which the energy dissipation is reduced.

In accordance with a preferred embodiment of the invention, an output shaft is supported rotatably and has a radially extending driven disc fixedly mounted thereon. First and second rotatably mounted drive members are positioned on opposite sides of the driven disc, and both of these drive members are coupled to an input shaft. An angular spacer ring formed of a non-conducting material is positioned between the first and second drive members.

The drive members are coupled together by a mechanically strong, torque-transmitting connection formed by a plurality of non-magnetic pins spaced apart about the periphery of the drive members. Each pin is formed of non-magnetic, nickel-chromium, stainless steel, and each pin is welded to or press fitted into the drive members. To conserve on space, the pins pass through the annular ring.

Means are provided to establish a magnetic field across the gap between the driven members and the drive disc to lock the magnetic particles in chains to provide conjoint rotation of the driven members and the drive disc.

Having briefly described this invention, it will be described in greater detail along with other objects and advantages in the following detailed description of a preferred form which may best be understood by reference to the accompanying drawings, in which:

FIG. 1 is a partially sectioned side view of a magnetic particle clutch construction in accordance with the present invention; and FIG. 2 is a perspective view of a portion of the clutch shown in FIG. 1.

In the figures, a magnetic particle clutch is identified generally by the numeral 10 including a housing 12 which is provided with a mounting flange 14 having mounting bolt holes 16 positioned about the rim.

The clutch 10 also includes an output shaft 18 which is supported rotatably by bearings 20 and 22. The positions of the bearings 20 and 22 are defined, respectively, by shoulders 24, 26 and retainers 28 and 30.

A driven disc 32 is fixedly secured to the output shaft 18, as by press fitting, and extends radially outwardly. A first drive member 34 and a second drive member 36 are positioned on opposite sides of the driven disc 32. An annular spacer ring 38 of nonconducting, non-magnetic material is positioned between the drive members 34 and 36. Such material as Teflon, silicon rubber, bonded ceramic materials and the like are suitable because they also retain good mechanical and electrical properties at elevated temperatures.

The drive members 34 and 36 are secured together and in sealing engagement with the ring 38 by a plurality of pins 40 positioned about the rim of the drive members. The pins 40 also are of non-magnetic material such as non-magnetic nickel, chromium, and stainless steel and may be press fitted into or welded to the drive members 34 and 36 to provide a rigid torque transmitting connection. The ring 38 and the shaft seals 42 and 44 define an annular space between the drive members 34 and 36 and the driven disc 32, which space is filled with magnetic particles 46 either suitably suspended in a carrier or in dry form.

The assembly of the drive members 34 and 36 is supported rotatably by bearings 48 and 50, the position of which is defined by shoulders 52 and 54 and by retainers 56 and 58.

To establish a magnetic field across the magnetic particles 46, a coil 62 and a core 64 having poles 66 and 68 positioned to develop a magnetic field through the high permeability material of the drive members 34 and 36, through the magnetic particles 46, and through the driven disc 32. With such flux linkage across the magnetic particles, the particles will lock in chains between the drive members and the driven disc thereby coupling the input shaft 70 with the output shaft 18.

Since the connection between the two driven members 34 and 36 is provided by the peripherally spaced retaining pins 40, a change of flux will not induce circulating currents and a bucking flux as is encountered normally with an electrically continuous torque tube.

For this reason, the bucking flux is reduced, the axial flux across the magnetic particle will build up more rapidly, and the response speed of the clutch is improved.

Similarly, the elimination of the circulating currents in a conducting torque tube eliminates a source of power dissipation within the clutch permitting the clutch to operate at relatively high cyclic rates with normal heat dissipation means.

This invention may be variously modified and embodied within the scope of the subjoined claims.

What is claimed is:

1. A magnetically operable clutch comprising,
   a rotatably mounted driven clutch member,
   first and second rotatably mounted drive members, mounted on opposite sides of said driven clutch member,
   a torque transmitting connection including a plurality of non-magnetic retainer pins extending between and secured to each of said drive members for coupling said first and second drive members together,
   a nonconductive spacer ring positioned between said first and second drive members and enclosing said driven member,
   magnetic particles positioned between said driven member and said first and second drive members, and
   means mounted separate from said drive and driven members to establish a magnetic field across said drive and driven members to lock said particles into chains coupling said drive and driven members.

2. A clutch in accordance with claim 1 which includes a rotatably mounted output shaft,
   said driven member being fixedly mounted on said output shaft,
   an input shaft,
   said input shaft being rotatably mounted concentric with said output shaft, and
   means coupling said input shaft to one of said first and second drive members.

3. A clutch in accordance with claim 2 which includes seals positioned on said output shaft on each side of said driven member and extending into sealing engagement with said first and second drive members.

4. A clutch in accordance with claim 1 in which said retaining pins are formed of nickel-chromium stainless steel.

5. A magnetic particle clutch comprising,
   a rotatably mounted drive shaft,
   a driven disc fixedly mounted on said shaft and extending radially therefrom,
   first and second rotatably mounted drive members positioned on opposite sides of said driven disc,
   an annular sealing ring positioned between said first and second drive members and about the periphery of said driven disc,
   said sealing ring being formed of a nonconductive material,
   a plurality of non-magnetic retaining pins extending between and securing together said first and second driven members about the periphery thereof,
   the spaces between said drive and driven members being filled with magnetic particles, and
   means mounted separate from said drive and driven members to establibsh a magnetic field across said drive and driven members.

References Cited by the Examiner
UNITED STATES PATENTS

| | | | |
|---|---|---|---|
| 2,575,360 | 11/51 | Rabinow | 192—21.5 |
| 2,917,707 | 12/59 | Perry et al. | 192—21.5 |

DAVID J. WILLIAMOWSKY, *Primary Examiner.*